(12) United States Patent
Jain et al.

(10) Patent No.: US 8,612,699 B2
(45) Date of Patent: Dec. 17, 2013

(54) DEDUPLICATION IN A HYBRID STORAGE ENVIRONMENT

(75) Inventors: Bhushan P. Jain, Maharashtra (IN);
John G. Musial, Newburgh, NY (US);
Abhinay R. Nagpal, Maharashtra (IN);
Sandeep R. Patil, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 12/823,255

(22) Filed: Jun. 25, 2010

(65) Prior Publication Data
US 2011/0320865 A1    Dec. 29, 2011

(51) Int. Cl.
*G06F 12/00*    (2006.01)
*G06F 13/00*    (2006.01)
*G06F 13/28*    (2006.01)

(52) U.S. Cl.
USPC ............................ 711/159; 711/161; 711/165

(58) Field of Classification Search
USPC .......................................... 711/159, 161, 165
See application file for complete search history.

(56) References Cited

U.S. PATENT DOCUMENTS

| | | | |
|---|---|---|---|
| 6,154,817 A | 11/2000 | Mohan et al. | |
| 6,647,514 B1 | 11/2003 | Umberger et al. | |
| 7,092,977 B2 | 8/2006 | Leung et al. | |
| 2007/0022129 A1 | 1/2007 | Bahar et al. | |
| 2009/0171888 A1 | 7/2009 | Anglin | |
| 2009/0235022 A1 | 9/2009 | Bates et al. | |
| 2009/0271402 A1 | 10/2009 | Srinivasan et al. | |
| 2010/0042790 A1 | 2/2010 | Mondal et al. | |
| 2010/0250501 A1* | 9/2010 | Mandagere et al. | 707/692 |
| 2010/0250896 A1* | 9/2010 | Matze | 711/216 |
| 2011/0184908 A1* | 7/2011 | Slater et al. | 707/609 |
| 2011/0289281 A1* | 11/2011 | Spackman | 711/154 |

OTHER PUBLICATIONS

Matteson, Ryan, Observing I/O Behavior with the DTraceToolkit, Dec. 22, 2007, Available at: http://web.archive.org/web/20071222165447/http://www.samag.com/documents/s=9915/sam0512a/0512a.htm.*
Bare Feats, [online]; [retrieved on May 11, 2010]; retrieved from the Internet http://www.barefeats.com/macair1.html Rob Morgan, SHOOTOUT: MacBook Air drives HDD versus SSD, Bare Feats, 2008.
Compellent, [online]; [retrieved on May 12, 2010]; retrieved from the Internet http://www.compellent.com/Products/Software/ Automated-Tiered-Storage.aspx Automated Tiered Storage, Compellent, 2010.
Wikipedia, [online]; [retrieved on May 11, 2010]; retrieved from the Internet http://en.wikipedia.org/wiki/Data_deduplication Data Deduplication, Wikipedia, modified May 10, 2010.
David Geer, Reducing the Storage Burden Via Data Deduplication, IEEE Computer Society, Dec. 2008, vol. 41, No. 12, pp. 15-17.
Wikipedia, [online]; [retrieved on May 11, 2010]; retrieved from the Internet http:en.wikipedia.org/wiki/Standard_RAID_levels Standard RAID levels, wikipedia, modified on May 6, 2010.

* cited by examiner

*Primary Examiner* — Ryan Bertram
(74) *Attorney, Agent, or Firm* — Cantor Colburn LLP (57) ABSTRACT

Deduplication in a hybrid storage environment includes determining characteristics of a first data set. The first data set is identified as redundant to a second data set and the second data set is stored in a first storage system. The deduplication also includes mapping the characteristics of the first data set to storage preferences, the storage preferences specifying storage system selections for storing data sets based upon attributes of the respective storage systems. The deduplication further includes storing, as a persistent data set, one of the first data set and the second data set in one of the storage systems identified from the mapping.

22 Claims, 4 Drawing Sheets

DEDUPLICATION IN A HYBRID STORAGE ENVIRONMENT

BACKGROUND

The present invention relates to data storage management, and more specifically, to deduplication in a hybrid storage network environment.

Cloud computing is a paradigm in which tasks are assigned to a combination of connections, software and services that are accessed over a network. This network of servers and connections is collectively known as "the cloud."

Based on the number and type of resources that make up the cloud, these resources may require a great deal of storage space. Advances in disk and storage technologies have helped to manage performance and space requirements of network clouds. For example, deduplication techniques have been developed for maximizing available storage space in which redundant data or files are eliminated from storage, thereby increasing the storage capabilities of the cloud.

While deduplication processes remove duplicate entries of files in storage, these processes do not consider factors such as file characteristics or the disk technology on which the files will be stored, nor do the processes consider redundant array independent disk (RAID) configurations or RAID rebuilding processes. For example, if multiple copies of a file are located on storage systems that employ different disk technologies, the deduplication processes do not consider which disk technologies or RAID configurations may provide better read and write performance. Further, during a RAID rebuild process, the RAID array remains accessible to users (e.g., a RAID controller allocates system resources to process user I/O requests, which in turn, uses CPU resources that may slow down overall performance).

SUMMARY

According to one embodiment of the present invention, deduplication in a hybrid storage environment is provided. The method includes determining characteristics of a first data set. The first data set is identified as redundant to a second data set and the second data set is stored in a first storage system. The deduplication also includes mapping the characteristics of the first data set to storage preferences, the storage preferences specifying storage system selections for storing data sets based upon attributes of the respective storage systems. The deduplication further includes storing, as a persistent data set, one of the first data set and the second data set in one of the storage systems identified from the mapping.

According to another embodiment of the present invention, a system for implementing deduplication in a hybrid storage environment is provided. The system includes a computer processor and a deduplication application executing on the computer processor. The deduplication application implements a method. The method includes determining characteristics of a first data set. The first data set is identified as redundant to a second data set and the second data set is stored in a first storage system. The deduplication also includes mapping the characteristics of the first data set to storage preferences, the storage preferences specifying system selections for storing data sets based upon attributes of the respective storage systems. The deduplication further includes storing, as a persistent data set, one of the first data set and the second data set in one of the storage systems identified from the mapping.

According to a further embodiment of the present invention, a computer program product for implementing deduplication in a hybrid storage environment is provided. The computer program product includes a storage medium encoded with machine-readable computer program code, which when executed by a computer, causes the computer to implement a method. The method includes determining characteristics of a first data set. The first data set is identified as redundant to a second data set and the second data set is stored in a first storage system. The deduplication also includes mapping the characteristics of the first data set to storage preferences, the storage preferences specifying storage system selections for storing data sets based upon attributes of the respective storage systems. The deduplication further includes storing, as a persistent data set, one of the first data set and the second data set in one of the storage systems identified from the mapping Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide for deduplication in a hybrid storage environment (e.g., a cloud storage architecture). In one exemplary embodiment, during a deduplication process in a hybrid storage cloud, the characteristics of a file are determined and mapped to a preferred disk technology (e.g., hard disk drive (HDD) or solid state drive (SSD)) and a storage system employing the preferred disk technology is used in determining a location in which a persistent instance of the file will be stored. In another exemplary embodiment, where the hybrid storage cloud utilizes logical units (LUNs) configured with various redundant array independent disk (RAID) configurations, the file characteristics are determined and mapped to a preferred RAID configured LUN, and the preferred RAID configuration is used in determining a location in which a persistent instance of the file will be stored. In a further exemplary embodiment, both disk technology and RAID configurations may be assessed in determining a location in which to store a persistent instance of redundant data. The exemplary deduplication processes also optimize system resources during a RAID rebuild process.

Figure 1:
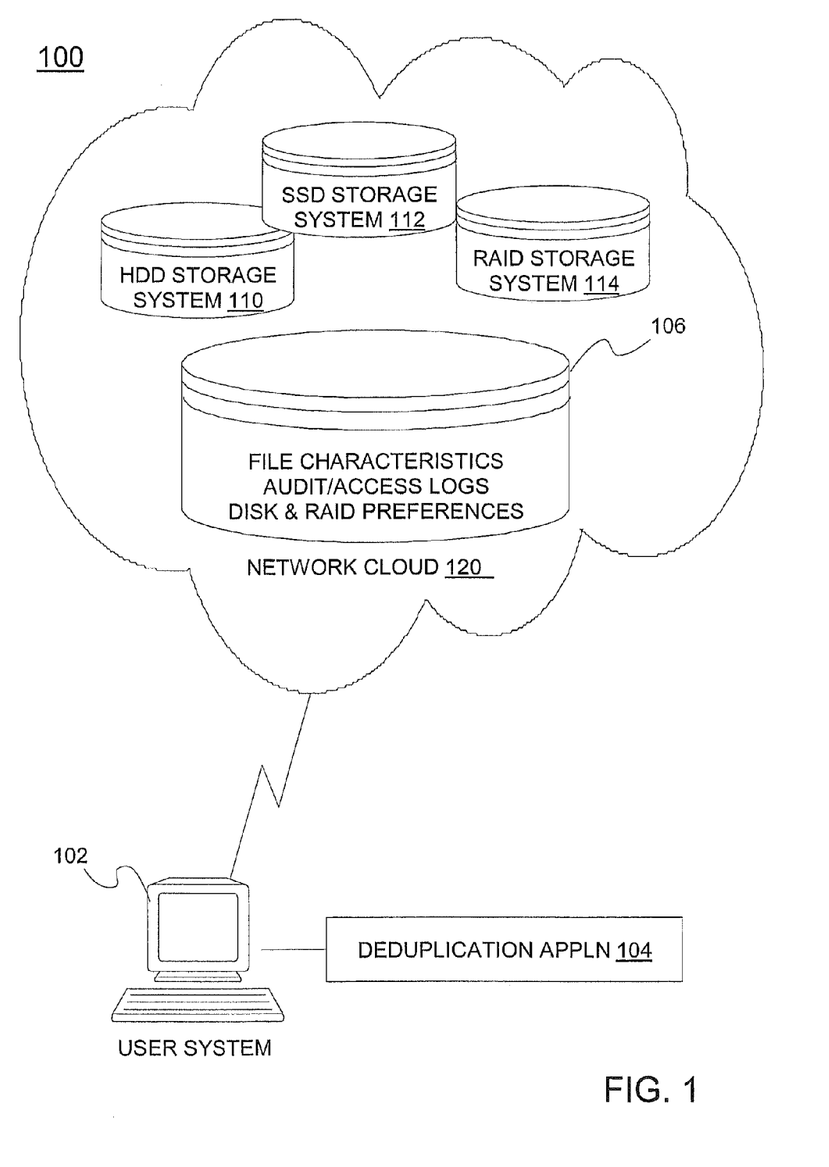
FIG. 1 depicts a block diagram of a system upon which deduplication in a hybrid storage environment may be implemented in an exemplary embodiment.

With reference now to FIG. 1, an exemplary system 100 upon which deduplication in a hybrid storage environment may be implemented will now be described. In an exemplary embodiment, the system 100 of FIG. 1 includes a user system 102 in communication with a network cloud 120. In an exemplary embodiment, the network cloud 120 is a hybrid storage environment that includes storage systems 110, 112, and 114, each of which respectively utilizes differing disk technologies and RAID configurations. In one exemplary embodiment, the network cloud 120 enables documents and files to be uploaded and shared with network users (e.g., the user system 102), as well as synched with multiple devices associated with a single network user). The network cloud 120 may include a combination of connections, software and services that are accessed by network users (e.g., user system 102). The network connections may be implemented using various network and data transmission protocols.

In an exemplary embodiment, each of the storage systems 110, 112, and 114, by virtue of their differing technologies and RAID configurations, includes attributes that distinguish each from the others. The particular nature of each of the attributes provide certain advantages and disadvantages that lend the individual storage systems 110, 112, and 114 suitable or relatively unsuitable for various applications or functions with respect to storing data, files, etc., and which suitability is used to define preferred storage systems, as will now be described.

In an exemplary embodiment, storage system 110 is a data storage device implemented using hard disk drive (HDD) 110 technology. HDD technology typically includes movable parts, such as an actuation arm and read/write heads used to seek out data on the storage system (disk) 110. The HDD storage system 110 is relatively inexpensive to implement as compared to, e.g., solid state disk (SSD) technology; however, due in part to its movable parts, it is generally less rugged and slower in performance than its counterpart, SSD.

In an exemplary embodiment, storage system 112 is implemented using solid state disk (SSD) technology, which utilizes a non-volatile NAND flash memory with no moving parts (e.g., no actuator arm or read/write heads). Because it has no movable parts, the SSD 112 is typically faster in reading from and writing to memory than storage systems using HDD technology. However, SSD technology is typically considerably more expensive than HDD technology. As SSD input/output operations are known to be much faster than HDD, SSD is ideal for tasks such as downloading video or the simultaneous use of multiple multi-media applications. SSD generally utilizes more batter power than HDD per hour of operation.

These, and other, disk technology attributes will be described further herein.

RAID technology for data storage divides and replicates data among several hard disks (e.g., HDD, SSD). RAID technology combines two or more physical hard disks into a single logical disk using hardware or software. In addition, RAID technologies include different configurations based upon system requirements. In a RAID configuration, information is stored in arrays of data storage media to provide fault tolerance and improved data access performance. For example, RAID 0 uses a process known as "data striping." RAID 1 uses data mirroring. RAID 0+1 uses a combination of both RAID 0 and RAID 1. In RAID 3, 4, 5, and 6 array configurations, data striping is used in combination with parity data, i.e., encoded redundant information. In RAID 6, both row stripes and diagonal stripes are used, and one set of parity is associated with each row stripe and another set of parity is associated with each diagonal stripe, for dual redundancy. In RAID 6, row parity may be concentrated in a single row parity storage media, and diagonal parity may be concentrated in a different single diagonal parity storage media, or row and diagonal parity may be distributed across all data storage media in the array. Each RAID stripe comprises a predetermined number of sequential logical block arrays. In an exemplary embodiment, the storage device 114 of FIG. 1 is implemented using RAID technology.

While shown in FIG. 1 as a single storage system 114 for ease of illustration and explanation, it will be understood that multiple differing RAID configured storage systems (e.g., RAID 0, 1, 2, etc.) may be included in the system 100 of FIG. 1 in order to realize the advantages of the exemplary embodiments.

HDD and SSD disk technologies are described in FIG. 1 as non-limiting examples of the types of disk technologies that may be considered in determining preferred storage of persistent instances of identified redundant data. It will be understood, however, that other disk technologies may be included in (or implemented in lieu of) the HDD and SSD disk technologies described herein. For example, Phase Change Memory and Racetrack Memory are two technologies that may be employed in the system 100 of FIG. 1.

The user system 102 may be a general-purpose computer (e.g., desktop, laptop, etc.), or may alternatively be implemented as a high-speed computer processing device, such as a mainframe computer. The user system 102 implements one or more applications and accesses the storage systems 110, 112, and 114 to read and write data to and from the storage systems 110, 112, and 114 in response to various operations conducted via the applications. In one exemplary embodiment, the user system 102 executes a deduplication application 104. In an alternative exemplary embodiment, the deduplication application 104 may be implemented by one or more network nodes (e.g., a network server) in the network cloud 120. As shown in FIG. 1 for illustrative purposes, the user system 102 implements the deduplication application 104.

In an exemplary embodiment, the user system 102 of FIG. 1 is in communication with a storage device 106, which may reside in the network cloud 120. Alternatively, the storage device 106 may be internal or external to the user system 102. In an exemplary embodiment, the storage device 106 stores file characteristics, audit/access logs, and disk/RAID preferences, which are used by the deduplication application 104 in implementing the exemplary processes described herein. In an exemplary embodiment, the deduplication application 104 utilizes file characteristics of a particular data set or file in view of the storage system technology attributes in determining a preferred technology and storage location for storing a persistent instance of the redundant data set or file.

In an exemplary embodiment, file characteristics will now be described. Files or data sets may be classified, e.g., via the deduplication application 104, into various categories, e.g., frequently read, frequently written, frequently read and written, files accessed sequentially, files access randomly, large files, small files, and a combination of the above. The classification may be performed using values, such as the amount of time the data set has been quiescent, how recently the data set has been used, a frequency of usage of the data set, elapsed time since last change to the data set, and historical patterns of data access. These characteristics may be determined through file attributes or using historical data access patterns associated with the data set or file (e.g., obtained from audit and/or access logs). For example, in an IBM DB2™ database system, a FETCH UDI (update delete insert counters) operation would yield a number of scans performed for associated tables, as well as information such as a number of UDI, RTSUDI, PgReorgs, NoChgUpdts, Reads, FscrUpdates, Inserts, Updates, Deletes, OvFlReads, OvFlCrtes, RowsComp, and RowsUncomp. Various toolkits may provide this information as well. For example, Dtrace may be used which provides, among other information, sequential versus random input/output (I/O) data. In one embodiment, system-wide access patterns may be obtained through an iopattern script.

The storage preferences may be defined, e.g., via the deduplication application 104, according to which of the particular attributes of the varying storage systems 110, 112, and 114 a redundant data set or file is best suited for storage based on the data set/file characteristics. For example, smaller files that are accessed randomly, SSD provides better (e.g., faster) performance than HDD for reading and writing operations due to the properties of the SSD, as outlined above. Thus, for small files that are frequently randomly read or frequently randomly written, SSD may be designated as the preferred disk technology to store the single instance of the data set. For small files accessed sequentially, HDD provides better (e.g., faster) performance for reading and writing operations than SSD. Thus, for small files that are frequently sequentially read or frequently sequentially written, HDD may be designated as the preferred disk technology to store the single instance of the data set.

For medium sized files read sequentially, SSD provides better (e.g., faster) performance for reading operations than HDD. Thus, for medium sized files that are frequently sequentially read, SSD may be designated as the preferred disk technology to store the single instance of the file. For medium sized files written sequentially, HDD provides better (e.g., faster) performance in writing operations than SSD. Thus, for medium sized files that are frequently sequentially written, HDD may be designated as the preferred disk technology to store the single instance of the file.

For large sized files, SSD provides better (e.g., faster) performance in reading operations than HDD. Thus, for large sized files that are frequently read, SSD may be designated as the preferred disk technology to store the single instance of the file. For large sized files, HDD provides better (e.g., faster) performance in writing operations than SSD. Thus, for large sized files that are frequently written, HDD may be designated as the preferred disk technology to store the single instance of the file.

Storage preferences may be defined based on various RAID configurations (e.g., RAID 0, 1, 2, etc.). Each RAID configuration has its own characteristics, and these characteristics offer several advantages and disadvantages. In the case of RAID 1, e.g., since all the stored data exists as two or more copies, each with its own hardware, the read performance can go up roughly as a linear multiple of the number of copies. RAID 3 may be most suitable for applications that demand the highest transfer rates in long sequential reads and writes, for example, uncompressed video editing. By contrast, applications that perform read operations and write operations of small files and from random locations over a disk can expect to have poor performance from the RAID 3 configuration. In the case of RAID 4, for writing, the parity disk becomes a bottleneck. For example, RAID 4 has a dedicated parity drive, and every normal block write is accompanied with writing data and parity blocks to this dedicated parity drive in the array. This signifies the bottleneck that the dedicated party drive represents, and this bottleneck can degrade write performance and limit parallelism in a multiple-transaction environment. RAID 5 implementations may suffer from reduced performance when faced with a workload that includes many write operations which are smaller than the capacity of a single stripe. This is because parity must be updated on each write, requiring read-modify-write sequences for both the data block and the parity block. Random write performance may also be reduced, especially at high concurrency levels common in large multi-user databases. RAID 6 does not have a performance penalty for read operations, but it does have a performance penalty on write operations because of the overhead associated with parity calculations. These various characteristics of the different RAID configurations are used by the exemplary deduplication processes in determining preferred RAID configured LUNs in which to store persistent instances of data.

By striping data and distributing the parity across all drives in a disk array, optimum performance may be realized by minimizing constant access to a single drive. If a drive fails in a RAID 6 array configuration, data written to the failed drive can be rebuilt using the parity data on the remaining drives. If the array is configured with an online spare drive, or hot spare, the RAID rebuild begins automatically when a failed drive is detected. If the array is not configured with a spare drive, then the RAID rebuild begins after the failed drive is replaced.

Figure 2:
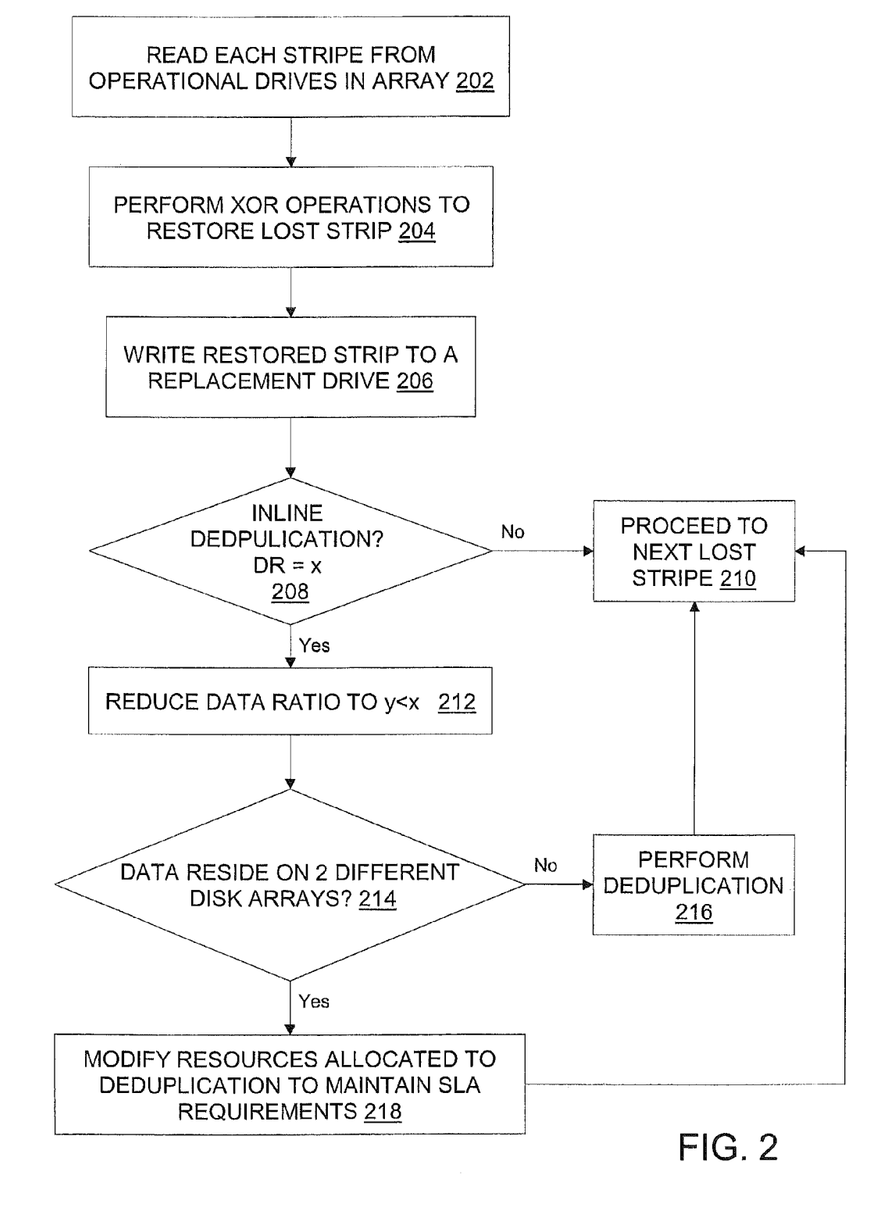
FIG. 2 illustrates a flow diagram for implementing deduplication processes during a RAID rebuild process for a RAID-configured storage environment in an exemplary embodiment.

Turning now to FIG. 2, a process for implementing a rebuild process including deduplication in an exemplary embodiment will now be described. At step 202, in order to rebuild lost data, each lost stripe is read from the remaining drives in the array. The lost stripe is restored using exclusive-OR ("XOR") operations performed by a RAID controller XOR engine at step 204. After the XOR engine restores the lost stripe, that restored stripe is written to the replacement or online spare drive at step 206. For RAID levels 3, 4, and 5, the rebuild process involves (N−1) read operations from the operational drives in the array and a single write operation to the replacement or online spare drive. For a double failure under RAID level 6, both row and diagonal stripes are used to construct the drive data being rebuilt to two spare drives.

In an exemplary embodiment, the deduplication application 104 determines whether the data blocks need to be inline deduplicated during a RAID rebuild process at step 208. If the data blocks do not need to be inline deduplicated, the rebuild process proceeds to restore the next lost stripe at step 210.

The effectiveness of data deduplication is often expressed as a deduplication or reduction ratio, denoting the ratio of protected capacity to the actual physical capacity stored. For example, a 10:1 ratio means that 10 times more data is protected than the physical space required to store it, and a 20:1 ratio means that 20 times more data can be protected. Factoring in data growth, retention, and assuming deduplication ratios in the 20:1 range, 2 TB of storage capacity could protect up to 40 TB of retained back data. Thus, returning to step 208, if the data blocks do need to be inline deduplicated, then at step 212 the deduplication ratio is set to x for normal inline deduplication, and during the RAID rebuild process the ratio needs to be reduced to y such that y<x and fewer blocks are deduplicated so that the inline deduplication process consumes fewer resources. This change in the ratio may be determined by considering how CPU intensive is the RAID rebuild process. For example, in RAID 1, disk failover and rebuild processes are not resource expensive since there exists a mirror disk so the disk is copied to a spare disk with a working image, whereas in the case of RAID 5 or RAID 6, the disk rebuild process upon a disk failure is computationally expensive since every block has to be rebuilt using parity from 4-5 disks. Thus, every rebuild of block requires more resources as compared to RAID 1. In the case of RAID 5 or RAID 6 rebuild processes, the inline deduplication ratio needs to be reduced so that the deduplication process consumes fewer resources and the difference in the number of resources consumed may be used for RAID rebuild processes without affecting user I/O performance. The value by which the deduplication percentage is to be reduced (x−y) may be calculated using various input parameters, such as the RAID rebuild overhead and user I/O workload, the overhead required for deduplication and the user defined SLA ratio.

In an exemplary embodiment, during a RAID rebuild process, runtime policy is implemented to restrict inline deduplication on certain files, such that more CPU resources are provided to the RAID rebuild without adversely affecting I/O performance. At step 214, in an exemplary embodiment, a determination is made whether a duplicated file resides on two different disk arrays, such that an amount of time to rebuild deduplicated data exceeds a user defined threshold. If not, at step 216, deduplication of the received data is continued, in response to determining that the deduplicated data has achieved a service level agreement (SLA) ratio. The SLA refers to a defined level of service with respect to system performance measured, e.g., in data rates). The process proceeds to step 210. Returning to step 214, if a duplicated file does not reside on two different disk arrays, and in order for the SLA ratio to be met, there may be a limitation placed on the turnaround time for the user I/O operations. If both the RAID rebuild process and the deduplication process are currently implemented during user I/O operations, this may affect turnaround time and thus affect the SLA ratio. In this instance, the inline deduplication process may be restricted to give preference to user I/O operations in order to meet the SLA ratio at step 218, and the process returns to step 210.

Figure 3:
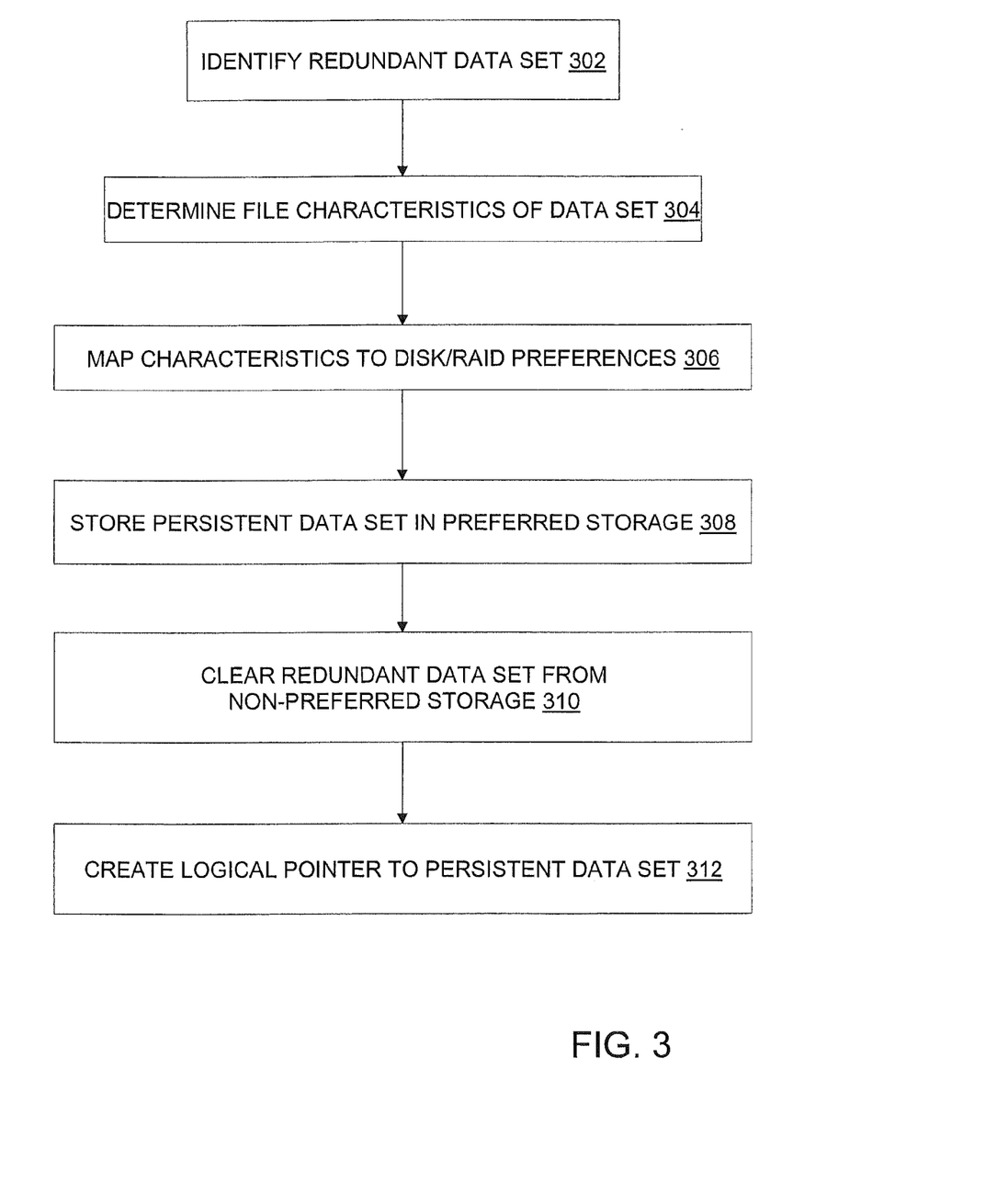
FIG. 3 illustrates a flow diagram describing a process for implementing deduplication in a hybrid storage environment in an exemplary embodiment.

Turning now to FIG. 3, an exemplary process for implementing deduplication in a hybrid storage environment will now be described. For purposes of illustration, and by way of non-limiting example, the process described in FIG. 3 assumes that deduplication occurs at a block level, referred to herein as a data set. However, it will be understood that the deduplication process may be implemented on a file level in order to realize the advantages of the exemplary embodiments. Block deduplication looks within a file and saves unique iterations of each block or bit. Each chunk of data is processed using a hash algorithm such as MD5 or SHA-1. This process generates a unique number for each piece which is then stored in an index. In contrast to file level deduplication, if a file is updated using block level deduplication, only the changed data is saved. That is, if only a few bytes of a document or presentation are changed, only the changed blocks or bytes are saved. These changes do not constitute an entirely new file. Therefore, block deduplication may potentially conserve more storage space than file deduplication.

At step 302, the deduplication application 104 identifies a redundant data set. For purposes of illustration, the redundant data set is also referred to as a "first data set" in order to distinguish it from the data to which it is considered redundant. Likewise, for purposes of illustration, the data stored in the system (e.g., one of storage systems 110, 112, and 114) for which the redundant data is identified is referred to herein as a "second data set."

At step 304, the deduplication application 104 determines file characteristics of the first data set. As indicated above, files may be classified, e.g., via the deduplication application 104, into various categories, e.g., frequently read, frequently written, frequently read and written, files accessed sequentially, files access randomly, large files, small files, etc. The classification may be done considering values such as: the amount of time the data has been quiescent, how recently the data has been used, a frequency of usage of the data, elapsed time since last change to the data, and historical patterns of data access.

At step 306, the deduplication application 104 maps the file characteristics to disk and/or RAID storage preferences. In a hybrid storage cloud (e.g., network cloud 120) with various disk technologies existing together, during a deduplication process, when the single instance of a redundant copy of a file or data set is subject to a determination of whether it will be kept persistent, the characteristics of the file are determined and mapped to the best available disk technology and then a decision is made as to which file's data (e.g., first or second data set) is striped across such that it is located on a storage system that employs that disk technology. In case of inline deduplication, the file (or second data set) may already be stored on the preferred disk technology. In the case of offline deduplication, if a file most frequently randomly read and is stored on a HDD storage system (e.g., storage system 110) as well as SSD storage system (e.g., storage system 112), the deduplication application 104 may determine that the preferred storage system is SSD, as it provides give better performance given the set of file characteristics. In this instance, the data set stored on the SSD storage system is kept persistent, while the data set stored on the HDD is removed.

Alternatively, in a hybrid storage cloud (e.g., network cloud 120) using logical units (LUNs) configured with various different RAID configurations, during a deduplication process, when a single instance of a redundant copy is subject to a determination of whether it will be kept persistent, the characteristics of the file are determined and mapped to the best available RAID configured LUN and then a decision is made as to which file's data (e.g., first or second data set) is striped across such that it is located on that RAID configured LUN. In the case of inline deduplication, the file (second data set) may already be stored on the preferred RAID configured LUN. In the case of the offline deduplication process, if a file is important and its availability is necessary, and it is currently stored on two different LUNs configured, e.g., with RAID 0 and RAID 1 configurations, the deduplication application 104 may determine that the preferred storage system (LUN) is RAID 1, since the whole of the disk in a RAID 1 configuration is redundant.

Additionally, in an exemplary embodiment, both the preferred disk technology and the preferred RAID configurations from the file characteristics can be used together to determine which RAID configured LUN using which underlying disk technology will be selected for storing the single instance of the redundant copy. Once the preferred disk technology and the preferred RAID configuration are determined, the preferred combination of both the configurations to select the LUN where the single copy of the file will reside is determined.

At step 308, the deduplication application 104 stores a single instance of the data set in the preferred storage location. As described above, the deduplication process may be performed inline. In this embodiment, prior to step 208 there is only a single instance of the data stored in the storage system (i.e., the second data set). The deduplication process is initiated in a response to a request (e.g., I/O request to store the second data set). In an alternative exemplary embodiment, the deduplication process is performed offline (e.g., post processing). In this embodiment, the redundant data set has also been stored in the storage system (e.g., one of storage systems 110, 112, and 114). The offline deduplication process is similar to the deduplication process described above except that it is implemented after the redundant data set is stored.

At step 310, the deduplication application 104 clears any redundant data from the non-preferred storage (if applicable). That is, a redundant instance of the data set is cleared when two sets of the data have been stored (e.g., in offline deduplication).

At step 312, the deduplication application 104 creates a logical pointer to the persistent data set, such that any future attempts to update a file associated with the data set are re-directed to the persistent data set.

As described above, the exemplary deduplication processes optimize system resources during a RAID rebuild process. In an exemplary embodiment, during a RAID rebuild process, runtime policy is implemented to restrict inline deduplication on certain files, such that more CPU resources are provided to the RAID rebuild without adversely affecting I/O performance. In an exemplary embodiment, a determination is made whether a duplicated file resides on two different disk arrays, such that an amount of time to rebuild deduplicated data exceeds a user defined threshold. If not, deduplication of the received data is continued, in response to determining that the deduplicated data has achieved a service level agreement (SLA) ratio. The SLA refers to a defined level of service with respect to system performance measured, e.g., in data rates. For the SLA ratio to be met, there may be a limitation placed on the turnaround time for the user I/O operations. If both the RAID rebuild process and the deduplication process are currently implemented during user I/O operations, this may affect turnaround time and thus affect the SLA ratio. In this instance, the inline deduplication process may be restricted to give preference to user I/O operations in order to meet the SLA ratio.

In an exemplary embodiment, a general set up of a constrained maximization problem includes choosing the levels of one or more variables, [x1, x2, . . . , xn] in order to maximize the value of a function f[x1, x2, . . . , xn] subject to some constraints g1[x1, x2, . . . , xn]. The function f is called the objective function, and the set of values of the variables that satisfies the constraints is referred to as a feasible set.

Variables to be maximized may include:
f(x)—amount of data deduplication; and
f(y)—amount of user I/O CPU time.
Constraints may include:
g(x)—function of SLA defined over user I/O; and
g(y)—time for RAID rebuild.

In an exemplary embodiment, a function g(x,y) represents the constraint function.

Considering the optimization problem f(x,y) subject to g(x,y)=c:

Critical points may be determined by using the following first order condition:

$$fx_1 = \frac{\partial f(x_1^*, x_2^*)}{\partial x_1} = 0;$$

$$fx_2 = \frac{\partial f(x_1^*, x_2^*)}{\partial x_2} = 0;$$

This problem may be solved using combination of methods, such as Newton's methods and Lagrange multipliers.

For example, extreme values of $f(x_1, x_2, \ldots x_n)$ may be determined when the point $(x_1, x_2, \ldots x_n)$ is restricted to lie on the surface $g(x_1, x_2, \ldots x_n)=k$. In multivariable calculus, the gradient of a function h is a normal vector to a curve in two dimensions or a surface in higher dimensions on which h is constant. The length of the normal vector doesn't matter. That is, any constant multiple of gradient is also a normal vector; therefore, the unknown constant multiplier λ is used because the magnitudes of the two gradients may be different.

In an exemplary embodiment, a first step in reducing (P) to a set of equations includes constructing a new function (e.g., the Lagrangian), which involves the original variables x, and a new set of variables, one for each constraint.

In an exemplary embodiment, a role in the analysis is implemented using the concept of a saddlepoint of the Lagrangian function. A saddlepoint is a pair of vectors (x*, λ*) such that x* maximizes the Lagrangian L(x, λ*). It is desirable to be able to convert the saddle-point condition into a set of equations, whose solutions characterize the saddle-point in order to assess the effect of changes in the constraints on the solution.

The value of $f(x_1, x_2, \ldots x_n)$ is maximized when surfaces gradient vectors at that point are parallel.

$$\nabla f(x_1, x_2, \ldots x_n) = \lambda \nabla g(x_1, x_2, \ldots x_n).$$

The number λ in the equation is known as the Lagrange multiplier.

Technical effects and benefits include enhancing cloud storage by removing duplicate entries of files and maintaining a single copy of the files in the system. The processes consider factors, such as the file characteristics or the disk technology on which the file will be stored and/or the RAID configurations or the RAID rebuilding process in order to determine a storage location most suitable for storing the files. The exemplary processes optimize system resources during a RAID rebuild process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
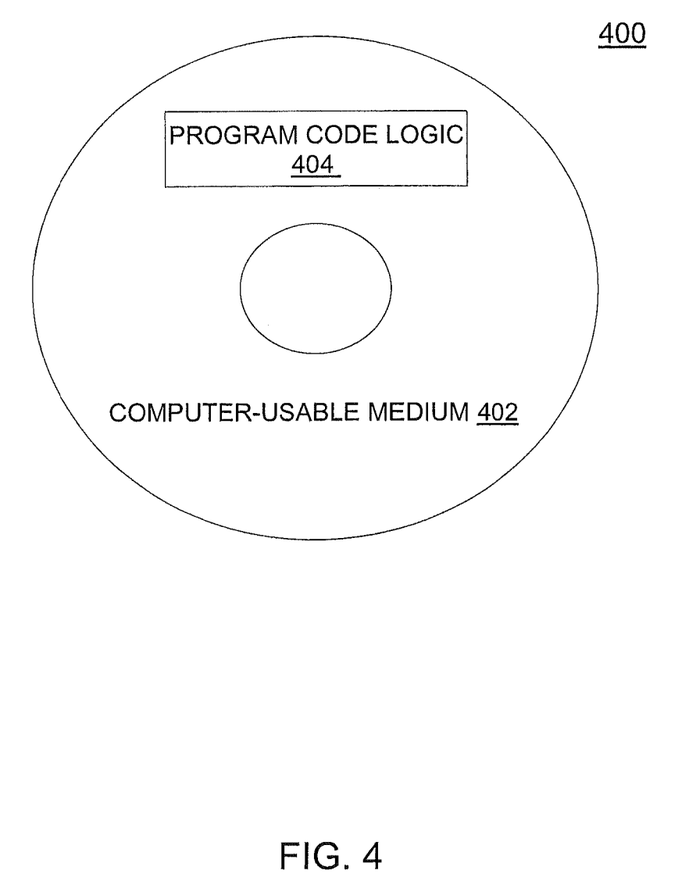
FIG. 4 illustrates a computer program product for implementing a rebuild and deduplication processes in a hybrid storage environment in an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for deduplication in a hybrid storage environment comprising disk and redundant array identification disk (RAID) storage systems, the method comprising:
   determining characteristics of a first data set via a computer processor, the first data set is identified as redundant to a second data set, the second data set stored in a first storage system, and the first data set is not stored;
   mapping the characteristics of the first data set to storage preferences, the storage preferences specifying selections of storage systems that include the first storage system and a second storage system, the storage systems configured for storing data sets based upon attributes of the storage systems; and
   storing, as a persistent data set, one of the first data set and the second data set in one of the storage systems identified from the mapping, the storing including:
   upon determining that the first storage system embodies a preferred disk technology from results of the mapping, maintaining storage of the second data set in the first storage system as the persistent data set and ignoring the first data set; and
   upon determining that a second storage system of the storage systems embodies the preferred disk technology from results of the mapping, storing the first data set in the second storage system as the persistent data set and clearing the second data set from the first storage system.

2. The method of claim 1, further comprising creating a logical reference pointer to the persistent data set.

3. The method of claim 1, wherein determining the characteristics of the first data set is performed in response to a request to store the first data set as part of an inline deduplication process.

4. The method of claim 1, wherein determining the characteristics of the first data set further includes accessing data recorded in at least one of an audit log and an access log associated with the hybrid storage environment.

5. The method of claim 1, wherein preferred disk technologies include hard disk drives and solid state disk drives.

6. The method of claim 1, wherein the characteristics include at least one of:
   frequently read;
   frequently written;
   frequently read and written;
   files accessed sequentially;
   files access randomly; and
   file size.

7. The method of claim 1, wherein the RAID storage system includes RAID-configured logical units (LUNs), the method further comprising:
   identifying a preferred RAID-configured LUN for storing as a persistent data set, one of the first data set and the second data set, the preferred RAID-configured LUN identified from results of the mapping.

8. The method of claim 7, further comprising rebuilding lost data for a failed RAID configuration and performing an inline deduplication process on rebuilt data, the deduplication process comprising:
   modifying an amount of resources allocated to the inline deduplication process as a function of a duration of the deduplication process in view of input/output performance with respect to a specified SLA ratio.

9. A system for deduplication in a hybrid storage environment comprising disk and redundant array identification disk (RAID) storage systems, the system comprising:
   a computer processor; and
   a deduplication application executing on the computer processor, the deduplication application implementing a method, comprising:
   determining characteristics of a first data set, the first data set is identified as redundant to a second data set, the second data set stored in a first storage system, and the first data set is not stored;
   mapping the characteristics of the first data set to storage preferences, the storage preferences specifying selections of storage systems that include the first storage system and a second storage system, the storage systems configured for storing data sets based upon attributes of the storage systems; and
   storing, as a persistent data set, one of the first data set and the second data set in one of the storage systems identified from the mapping, the storing including:
   upon determining that the first storage system embodies a preferred disk technology from results of the mapping, maintaining storage of the second data set in the first storage system as the persistent data set and ignoring the first data set; and
   upon determining that a second storage system of the storage systems embodies the preferred disk technology from results of the mapping, storing the first data set in the second storage system as the persistent data set and clearing the second data set from the first storage system.

10. The system of claim 9, wherein the method further comprises creating a logical reference pointer to the persistent data set.

11. The system of claim 9, wherein determining the characteristics of the first data set is performed in response to a request to store the first data set as part of an inline deduplication process.

12. The system of claim 9, wherein determining the characteristics of the first data set further includes accessing data recorded in at least one of an audit log and an access log associated with the hybrid storage environment.

13. The system of claim 9, wherein preferred disk technologies include hard disk drives and solid state disk drives; and
   wherein the characteristics include at least one of:
   frequently read;
   frequently written;
   frequently read and written;
   files accessed sequentially;
   files access randomly; and
   file size.

14. The system of claim 9, wherein the RAID storage system includes RAID-configured logical units (LUNs), the method further comprising:
   identifying a preferred RAID-configured LUN for storing as a persistent data set, one of the first data set and the second data set, the preferred RAID-configured LUN identified from results of the mapping; and
   rebuilding lost data for a failed RAID configuration and performing an inline deduplication process on rebuilt data, the deduplication process comprising:
   modifying an amount of resources allocated to the inline deduplication process as a function of a duration of the deduplication process in view of input/output performance with respect to a specified SLA ratio.

15. A computer program product for deduplication in a hybrid storage environment, the computer program product comprising a non-transitory storage medium encoded with machine-readable computer program code, which when executed by a computer, cause the computer to implement a method, the method comprising:

determining characteristics of a first data set, the first data set is identified as redundant to a second data set, the second data set stored in a first storage system, and the first data set is not stored;

mapping the characteristics of the first data set to storage preferences, the storage preferences specifying selections of storage systems that include the first storage system and a second storage system, the storage systems configured for storing data sets based upon attributes of the storage systems; and     storing, as a persistent data set, one of the first data set and the second data set in one of the storage systems identified from the mapping, the storing including:

upon determining that the first storage system embodies a preferred disk technology from results of the mapping, maintaining storage of the second data set in the first storage system as the persistent data set and ignoring the first data set; and     upon determining that a second storage system of the storage systems embodies the preferred disk technology from results of the mapping, storing the first data set in the second storage system as the persistent data set and clearing the second data set from the first storage system.

16. The computer program product of claim 15, wherein the method further comprises creating a logical reference pointer to the persistent data set.

17. The computer program product of claim 15, wherein determining the characteristics of the first data set is performed in response to a request to store the first data set as part of an inline deduplication process.

18. The computer program product of claim 15, wherein determining the characteristics of the first data set further includes accessing data recorded in at least one of an audit log and an access log associated with the hybrid storage environment.

19. The computer program product of claim 15, wherein preferred disk technologies include hard disk drives and solid state disk drives.

20. The computer program product of claim 15, wherein the characteristics include at least one of:

frequently read;
    frequently written;
    frequently read and written;
    files accessed sequentially;
    files access randomly; and
    file size.

21. The computer program product of claim 15, wherein the RAID storage system includes RAID-configured logical units (LUNs), the method further comprising:

identifying a preferred RAID-configured LUN for storing as a persistent data set, one of the first data set and the second data set, the preferred RAID-configured LUN identified from results of the mapping.

22. The computer program product of claim 21, further comprising rebuilding lost data for a failed RAID configuration and performing an inline deduplication process on rebuilt data, the deduplication process comprising:

modifying an amount of resources allocated to the inline deduplication process as a function of a duration of the deduplication process in view of input/output performance with respect to a specified SLA ratio.

\* \* \* \* \*